United States Patent [19]
Flanagan

[11] Patent Number: 6,158,794
[45] Date of Patent: Dec. 12, 2000

[54] TRANSPORT TEMPERATURE CONTROL UNIT WITH REMOVABLE PANEL

[75] Inventor: Thomas A. Flanagan, St Louis Park, Minn.

[73] Assignee: Thermo King Cofp., Minneapolis, Minn.

[21] Appl. No.: 09/300,770

[22] Filed: Apr. 27, 1999

[51] Int. Cl.[7] ...................................................... B60H 1/32
[52] U.S. Cl. ........................ 296/37.6; 296/24.1; 62/239; 312/265.6
[58] Field of Search ................................. 296/24.1, 37.1, 296/37.6; 62/239; 312/265.6

[56] References Cited

U.S. PATENT DOCUMENTS

| | | | |
|---|---|---|---|
| 2,572,774 | 10/1951 | Smith et al. | 296/37.6 X |
| 4,325,594 | 4/1982 | Lang et al. | 312/265.6 X |
| 5,711,587 | 1/1998 | Takahashi et al. | 312/265.6 |

Primary Examiner—Dennis H. Pedder
Attorney, Agent, or Firm—Michael M. Gnibus

[57] ABSTRACT

A transport temperature control unit for a vehicle, the temperature control unit including a frame having a first rail member which defines a guide channel; and an access panel having a top access panel edge movable between a first position where the top edge is adjacent the frame and a second position where the top edge is located away from the frame, the access panel further including at least one hinge member with a flange fixed to the access panel and a guide portion located in the guide channel, the guide portion having a support portion with a center, the hinge being rotatable about the support portion center to move the access panel to the second. The access panel also being movable to a third position where the first edge is located a second distance from the frame. The hinge being rotatable about the center and movable linearly in the guide channel to move the panel to the third position.

31 Claims, 10 Drawing Sheets

TRANSPORT TEMPERATURE CONTROL UNIT WITH REMOVABLE PANEL

BACKGROUND OF THE INVENTION

The invention relates to a transport temperature control unit, and more particularly the invention relates to a transport temperature control unit with an access panel that has at least one hinge member having a guide portion removably located in a guide channel defined by the unit frame.

Trucks frequently transport cargo that must be maintained at a predetermined temperature during transportation in order to preserve the quality of the cargo. Trucks that transport such temperature sensitive cargo have a conditioned space that is maintained at a predetermined temperature by a temperature control unit mounted to the truck at a location that is either above the truck cab or underneath the truck frame. These temperature control units are respectively referred to as "nosemount" and "undermount" transport temperature control units.

Conventional truck temperature control units are substantially enclosed by a housing with laterally extending door panels at opposite ends, a longitudinally extending housing panel, and a discrete condenser air inlet grille member along the longitudinal housing side. The inlet grille is fixed to the unit housing at a location in front of the unit's condenser coil by a large number of fasteners such as bolts, screws or other conventional fasteners.

On conventional truck units, especially undermount truck units, the condenser coil is exposed to a considerable amount of road dirt, and other undesirable matter and as a result the condenser coil must be cleaned frequently, for example once a week. In order to provide the required regular maintenance to the condenser coil, the condenser inlet grille must first be taken off the housing by the unit operator. The relatively large number of connection members fastening the grille to the housing make grille removal a time consuming task. As a result, the condenser coil is not cleaned or otherwise maintained as often as necessary to keep the unit operating efficiently. Not cleaning or otherwise maintaining the condenser coil regularly decreases the efficiency of the unit and ultimately decreases the unit's useful life.

In undermount truck units, when it is necessary to remove the grille the operator must kneel on the ground in order to provide the requisite torque necessary to remove the grille fasteners. In snowy or rainy weather where the ground may be muddy or snow covered, the operator is even less likely to perform the required condenser coil maintenance.

The door panels at the lateral ends of the housing are fixed to the housing by conventional hinges. During unit maintenance the lateral door panels are swung open to gain access to the unit components. The doors do not include a means for keeping the doors in place and as a result, they frequently blow closed or otherwise interfere with the operator's servicing of the unit.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a transport temperature control unit including a unit frame having a first rail member which defines a guide channel; and an access panel having a top access panel edge movable between a first position where the top edge is adjacent the unit frame and a second position where the top edge is located away from the unit frame, the access panel further including at least one hinge member with a flange fixed to the access panel and a guide portion located in the guide channel, the guide portion having a support portion that supports the access panel.

In another aspect of the invention, the panel is moved from the first position to the second position by rotating the hinge about the center of the support portion.

In another aspect of the invention, the access panel is moved to a third position by rotating the hinge about the center of the support portion and moving the guide portion linearly within the guide channel.

In another aspect of the present invention, the at least one hinge member includes a hook portion joining the flange and guide portion and the hook portion is adapted to engage the first rail member when the access panel is moved to the second position.

In a further aspect of the temperature control unit of the present invention, the first rail member is comprised of an outer track and an inner track seated on the inner track. The outer track is unitary and is comprised of an outer lip and a base; the inner track is unitary and is comprised of a first land portion, a second land portion, and a rise portion joining the first and second land portions; and the first rail member guide channel is defined by the outer lip, the first land portion and the rise portion.

The access panel of the present invention is easily removed from the unit greatly decreasing the time necessary to gain access to the unit components for servicing. The access panel of the present invention makes it much easier to gain access to regularly serviced components such as the air cleaner, belts such as the belt for the engine water pump, compressor service valves, and the coolant expansion tank, and also to check the oil level. Removal of the access door is accomplished quickly without the need to remove any fasteners before removing the panel. The operator can move the panel from the closed position to an intermediate position to perform basic servicing requiring limited access to the unit components. When major service to the unit is required full access to the unit components can be achieved by either removing the panel or moving the panel to a fully open position.

The foregoing and other aspects will become apparent from the following detailed description of the invention when considered in conjunction with the accompanying drawing figures.

DESCRIPTION OF THE DRAWING FIGURES

Figure 8:
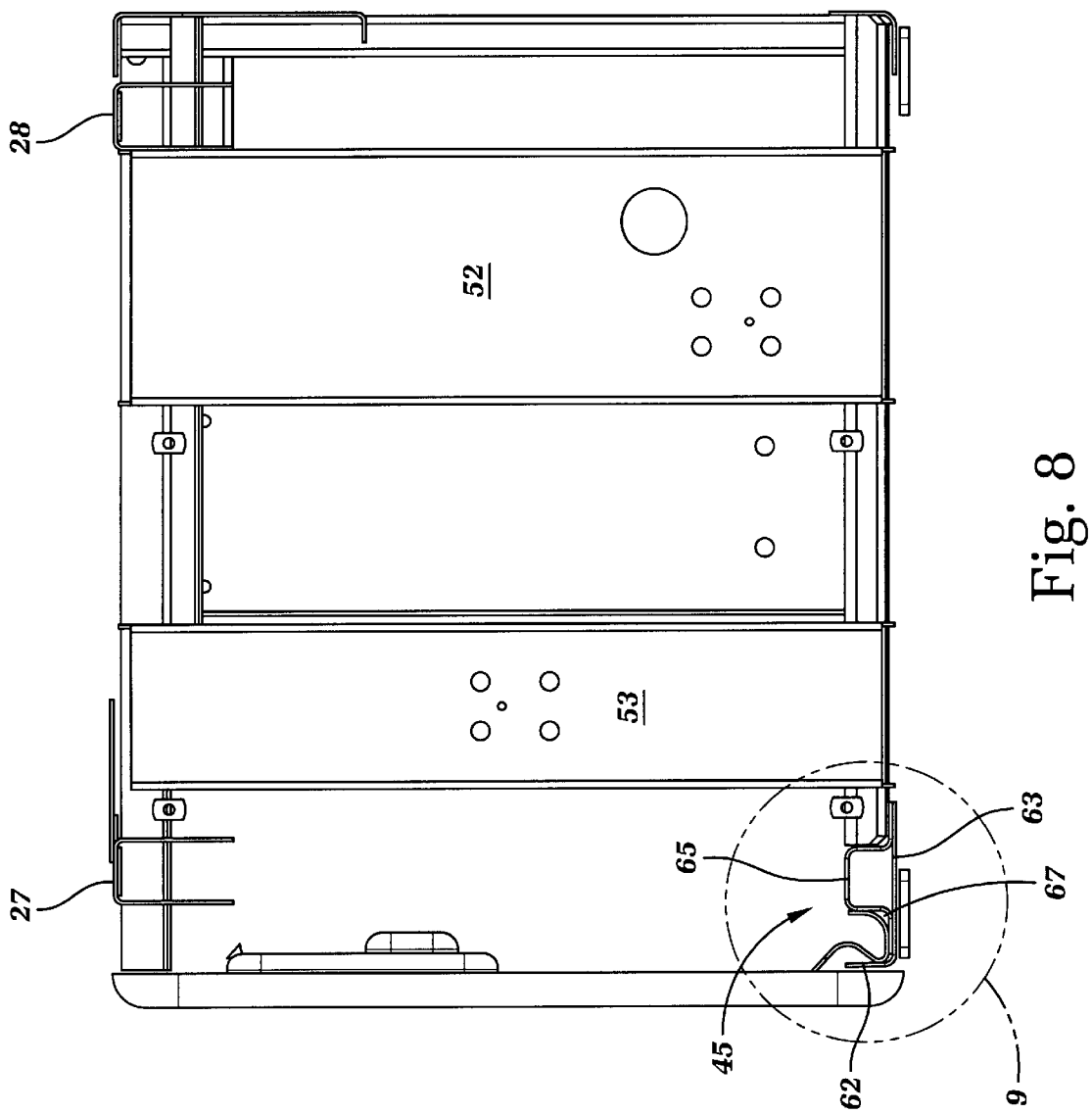
FIG. 8 is a side elevational view of an end of the temperature control unit with the removable access panel closed.
Figure 9A:
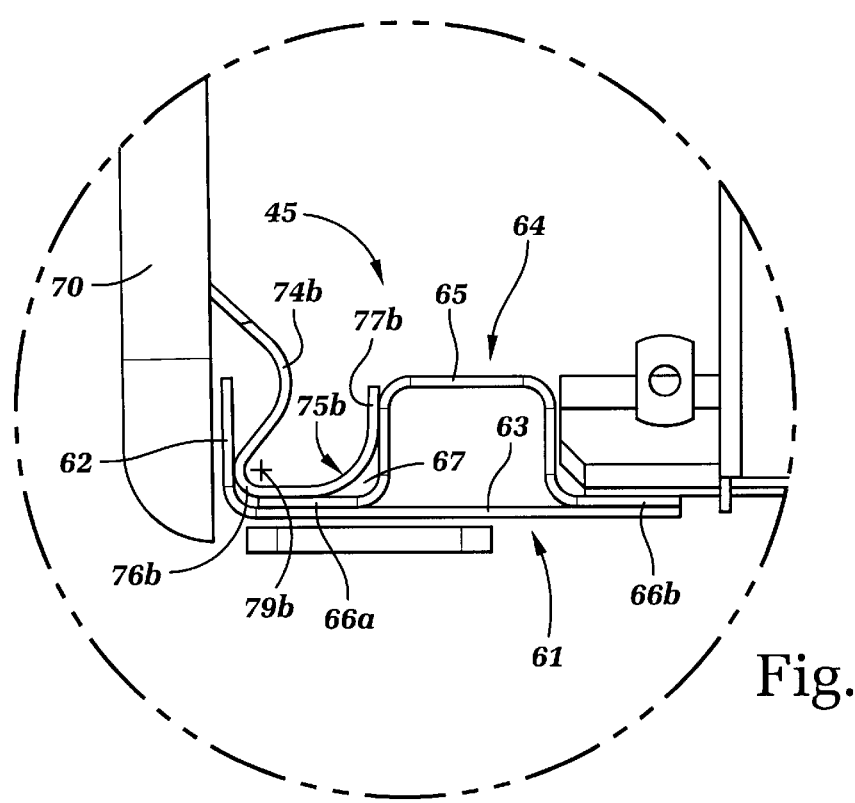
Figure 9B:
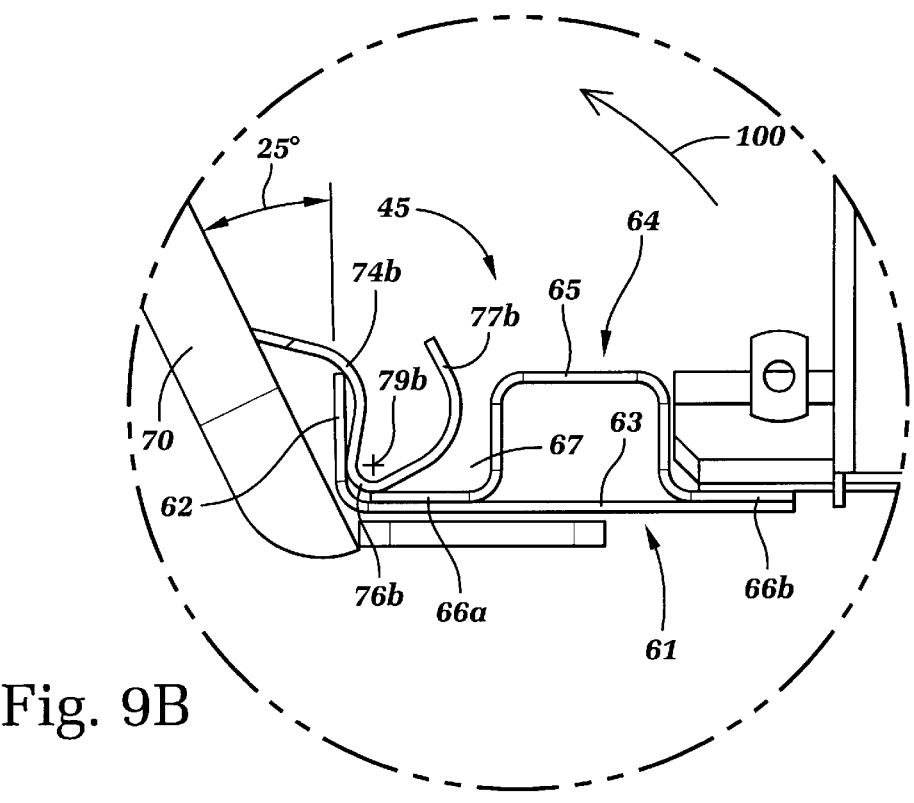
Figure 9C:
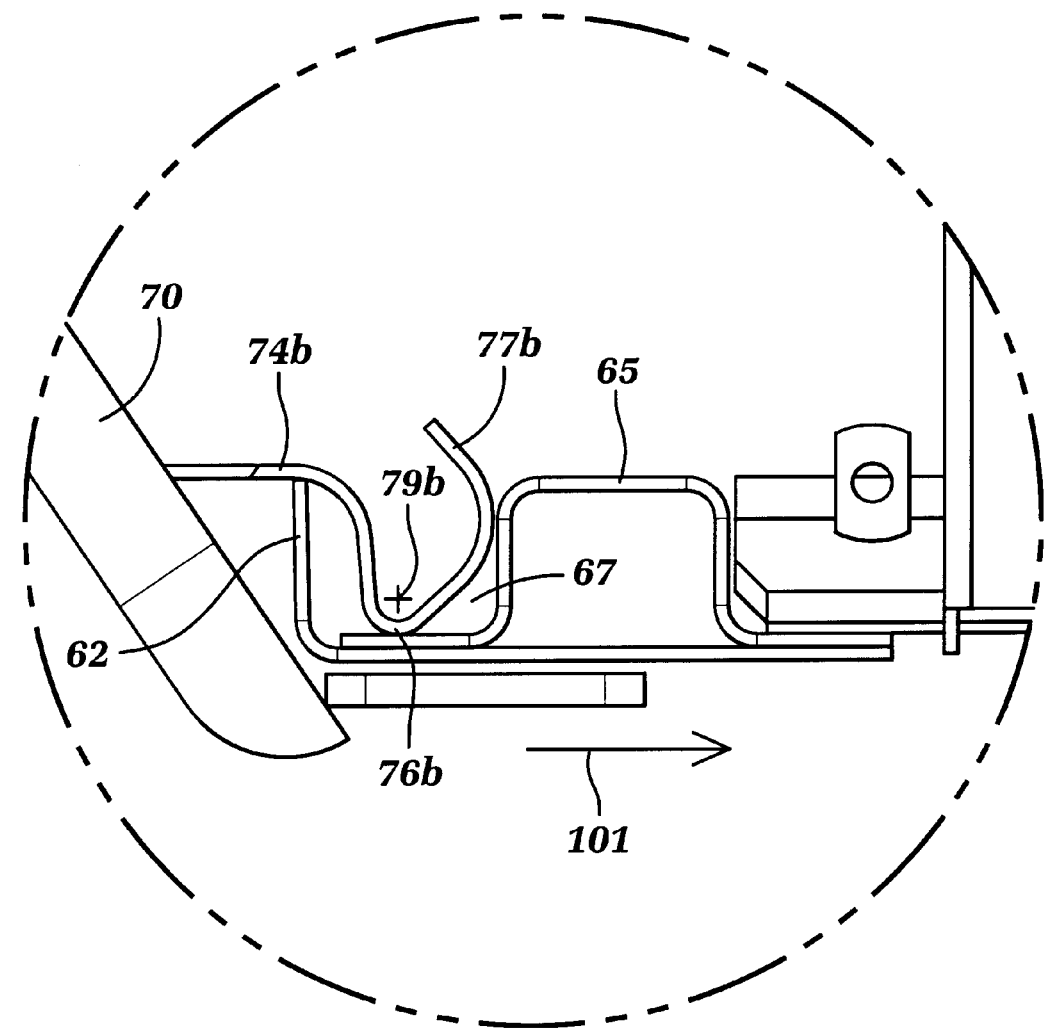

FIGS. 9a, 9b, and 9c are enlarged partial views of the area circled in FIG. 8 illustrating movement of the access panel and hinge when the access panel is moved from closed, intermediate, and open positions respectively.

DESCRIPTION OF THE PREFERRED EMBODIMENT

Figure 1:
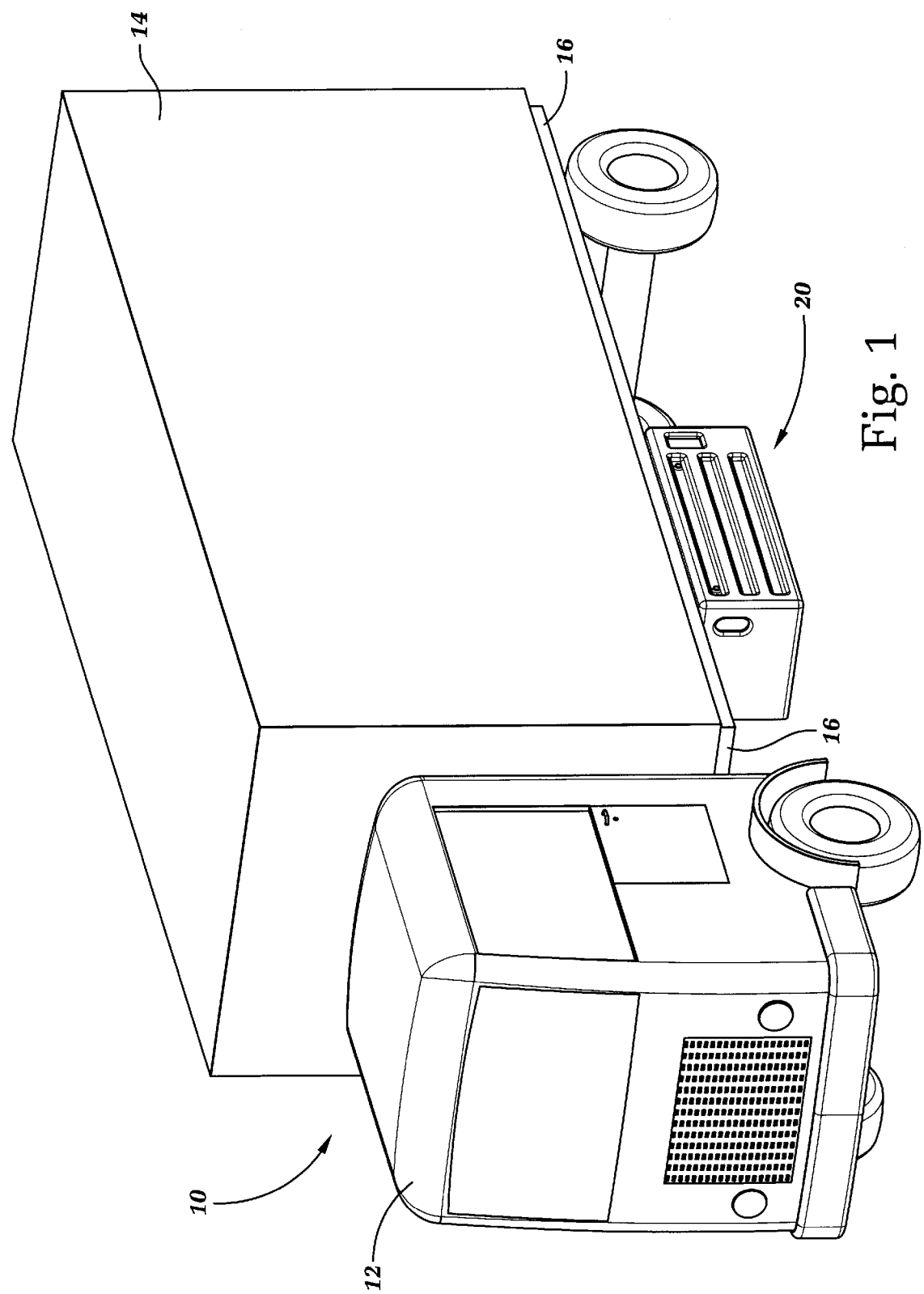
FIG. 1 is a perspective view showing the temperature control unit of the present invention mounted on a truck.

Turning now to the drawings wherein like parts are referred to by the same number throughout the several views, and particularly FIG. 1, vehicle 10 is a conventional truck having a cab or passenger compartment 12 and conditioned space 14 located behind the cab. The cab and conditioned space are supported by vehicle frame 16. The conditioned space 14 is maintained at the desired temperature by temperature control unit 20 of the present invention. Unit 20 is attached to frame 16 under the unit frame. For purposes of describing the preferred embodiment of the invention unit 20 is shown an undermount unit however it should be understood that unit 20 could also be a nosemount unit mounted on the truck conditioned space 14 above cab 12.

Transport temperature control unit 20 includes the conventional components which comprise a system for controlling the temperature in the conditioned space. For example, the system includes condenser coil 21, electrical controller housing 22, engine coolant expansion tank 23, engine muffler 24, and air plenum section 32 located behind the condenser coil 21. For simplicity, the Figures do not show the refrigerant compressor and prime mover which drives the compressor however, these components are located in compressor chamber 25 and engine chamber 26 illustrated in FIG. 2 and 3. The system components are supported unit frame 40 shown in FIG. 5. The system components are well known to one skilled in the relevant art and therefore further description of these components is not required.

Figure 5:
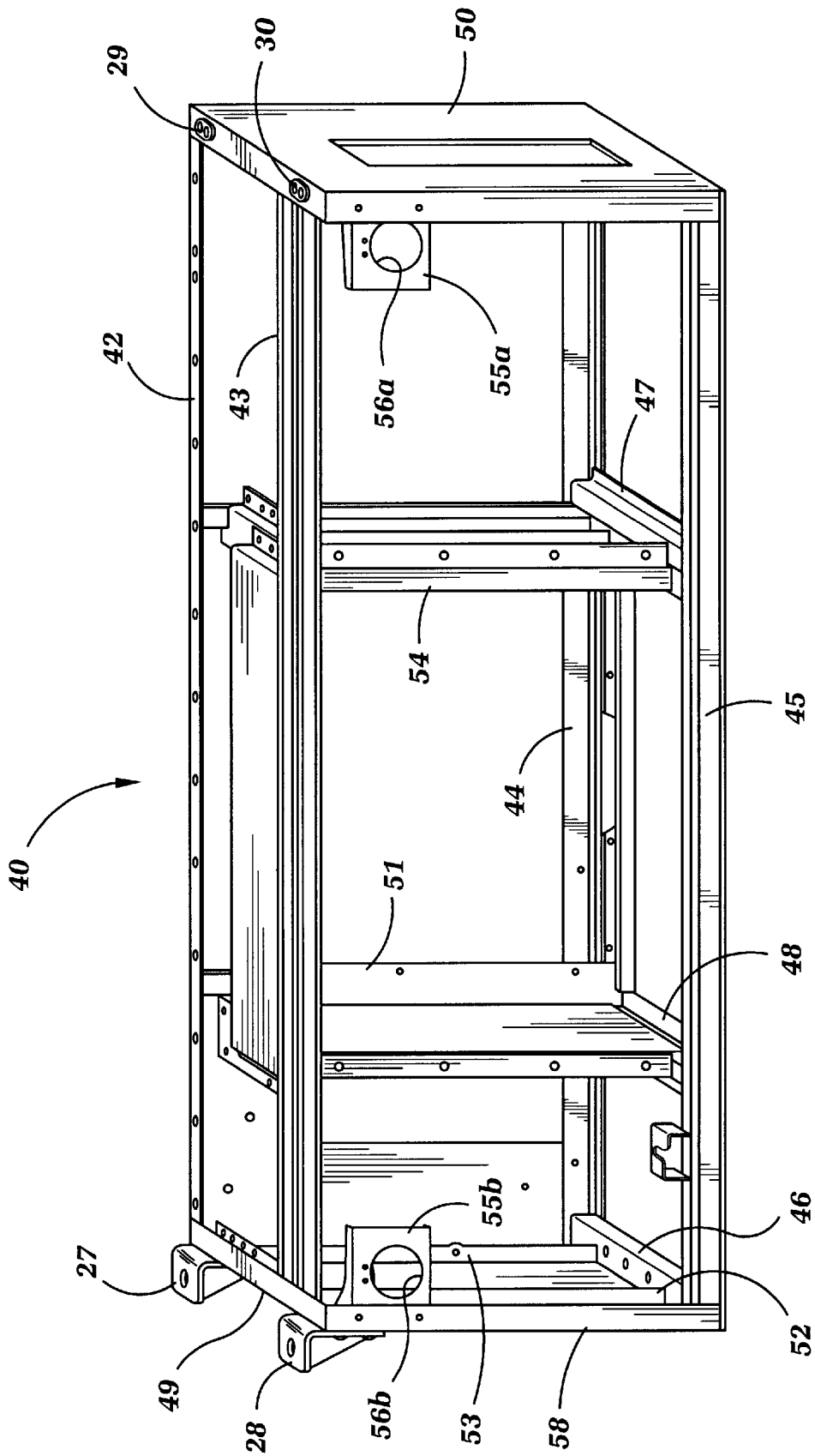
FIG. 5 is a perspective view of the frame of the transport temperature control unit.

Turning to FIG. 5, which illustrates frame 40 in greater detail, the frame includes a pair of elongate upper rails 42 and 43 and a pair of elongate lower rail members 44 and 45. As shown in FIG. 5, the upper and lower longitudinal rails are substantially parallel. The longitudinally extending rails 42–45 are joined by lateral supports 46, 47, 48, 49, and 58 and lateral panels 50 and 51, 52, 53 and 54. The unit frame is attached to the vehicle frame in a conventional manner at mounting brackets 27, 28, 29, and 30 which are fixed to frame members 49 and 50 respectively.

As shown in FIGS. 8, 9a, 9b, and 9c, lower rail 45 has an outer track 61 with an upwardly directed front lip 62 and a substantially horizontal base 63 which both extend along the length of the longitudinal rail member 45. An inner track 64 is seated on inner track base 63 behind lip 62. In the inner track, a U-shaped rise portion 65 joins substantially planar land portions 66a and 66b which support the inner track on the base 61. The front lip 62, land portion 66a and rise portion 65 define hinge guide channel 67 which extends along the length of the rail 45.

Latch locking plates 55a and 55b are fixed to lateral panels 50 and 58 respectively. The locking plates are fixed to the lateral panels by a conventional means such as by a weld, rivet or conventional fastener. Locking plates have openings 56a and 56b adapted to permit detentes 58a and 58b of locking members 57a and 57b to pass through the locking plates 55a and 55b.

Figure 2:
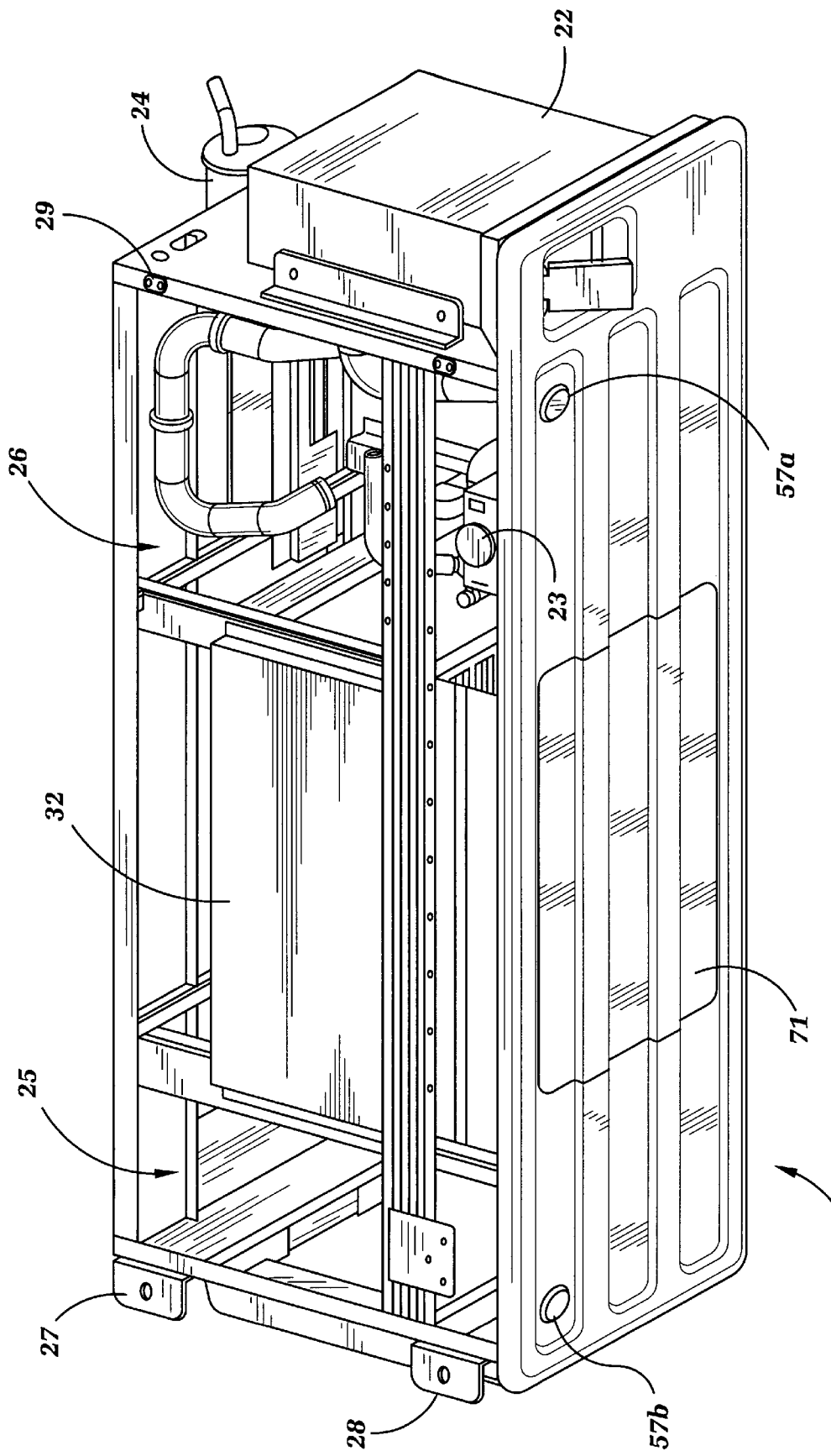
FIG. 2 is a perspective view of the temperature control unit of FIG. 1.
Figure 6:
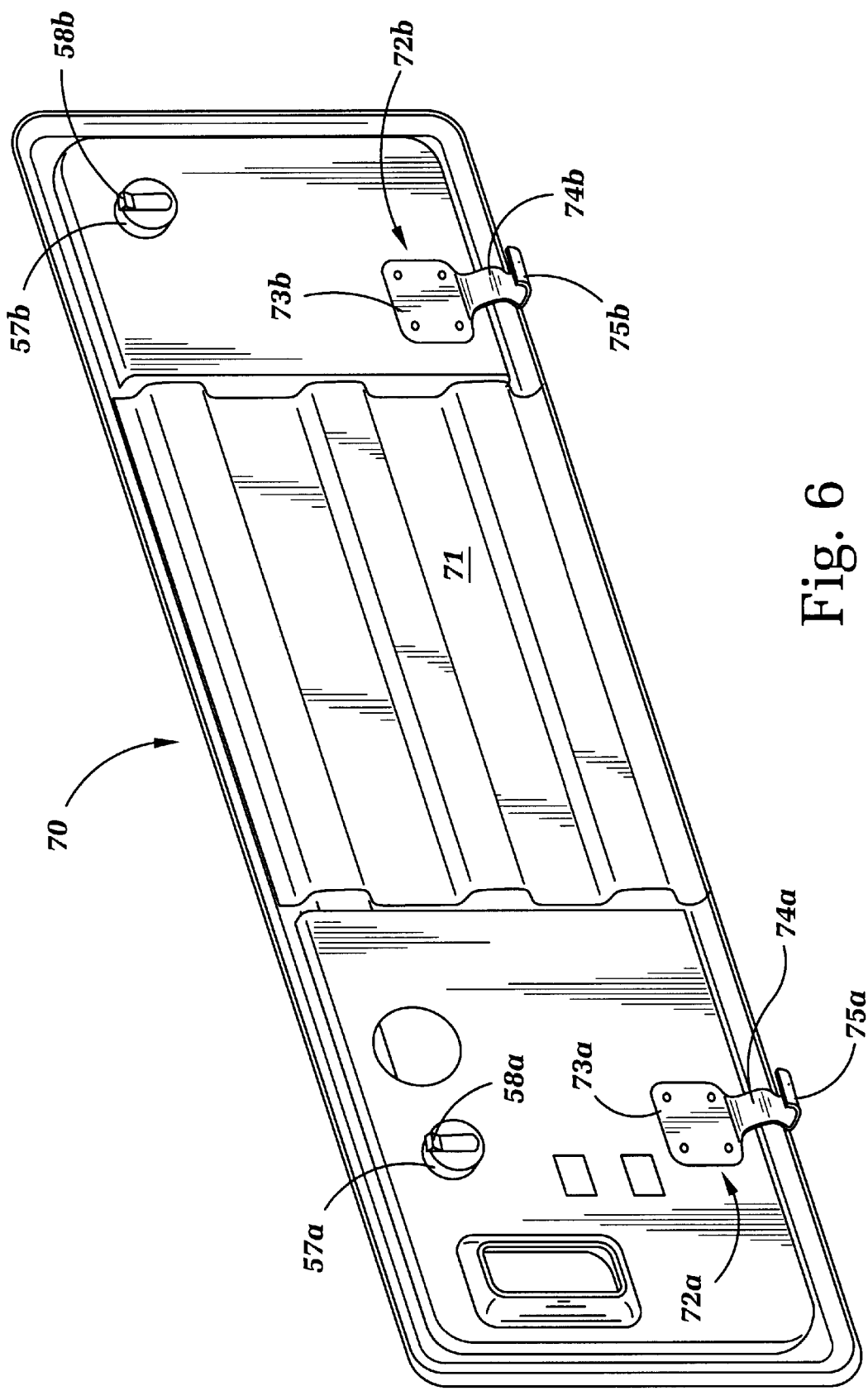
FIG. 6 is a perspective view of the back of the removable access panel.
Figure 7:
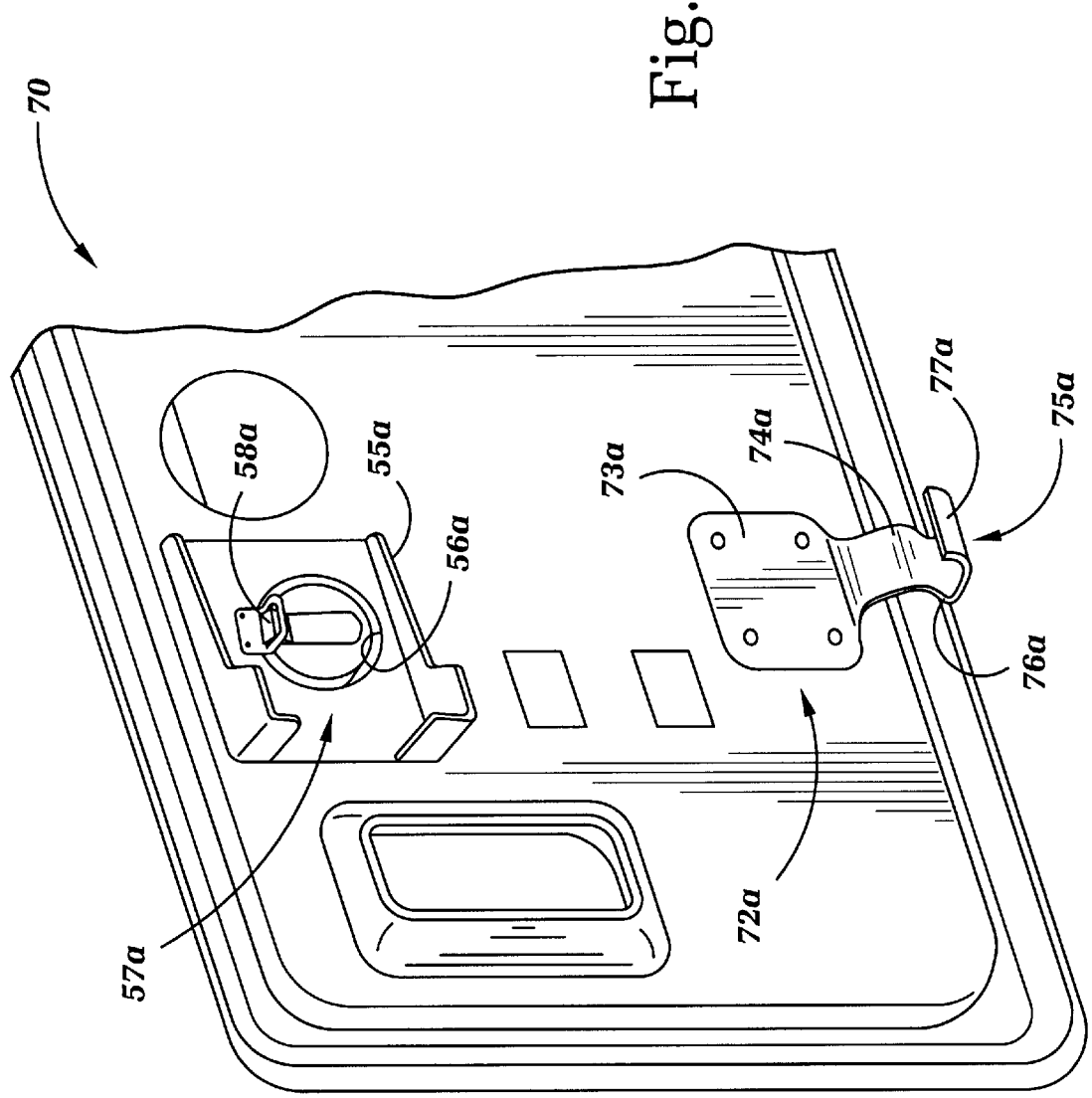
FIG. 7 is a detailed view of a portion of the removable access panel of FIG. 6.

Locking member 57a and 57b are fixed to access panel 60 as shown in FIGS. 2, 6, and 7. As shown in FIG. 7, detente 58a engages locking member 55a to hold the access panel 70 in place when the panel is closed. In order to open the panel, The members 57a and 57b are depressed, (See FIG. 2) and as a result move the detentes out of engagement with the locking plates and thereby unlock and open the access panel.

The access panel 70 greatly improves accessibility to the components of temperature control system, especially access to condenser coil 21. In this way, it is more likely that regular maintenance will be provided to temperature control unit 20.

Figure 3:
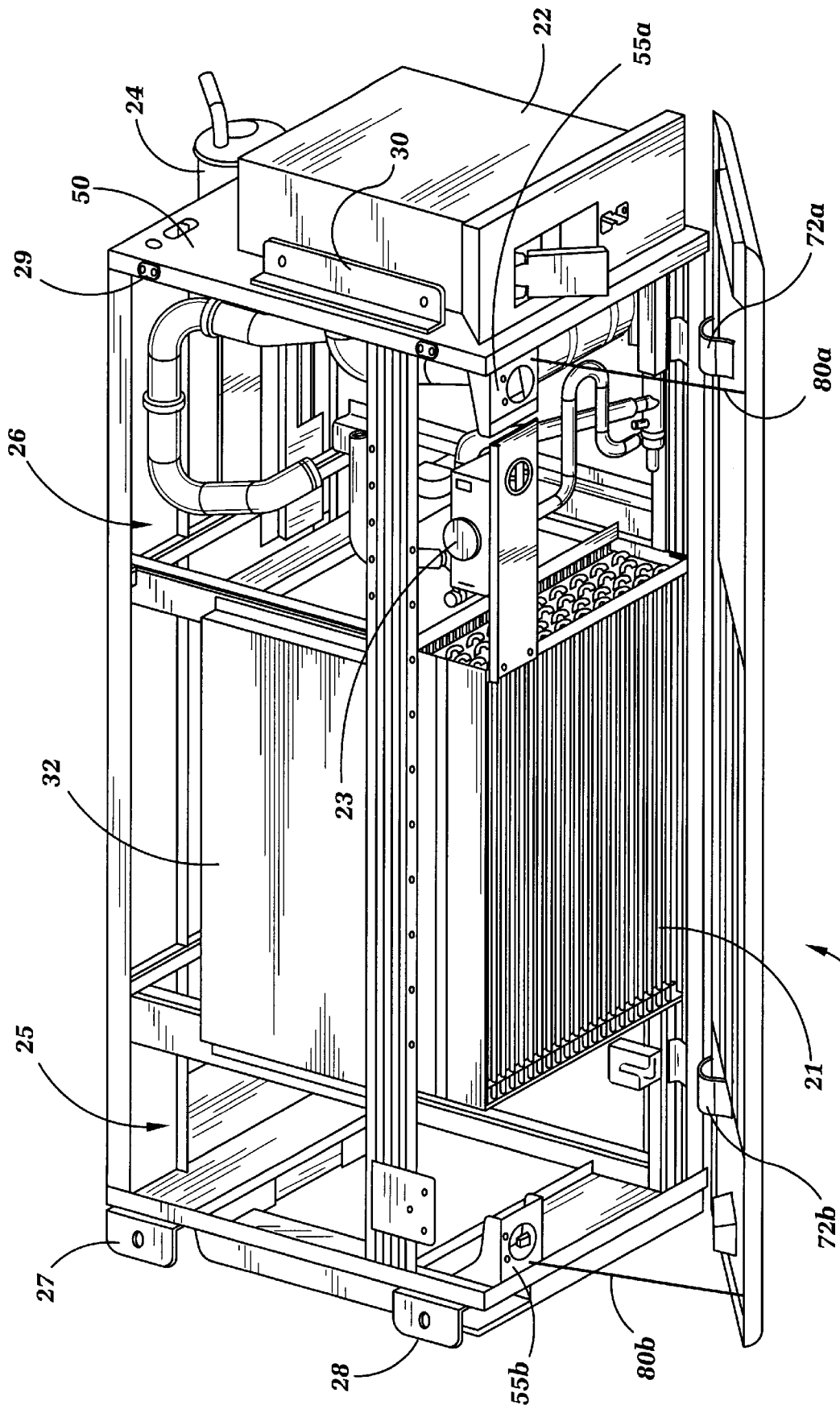
FIG. 3 is the temperature control unit of FIG. 2 with the access panel tilted away from the unit.
Figure 4:
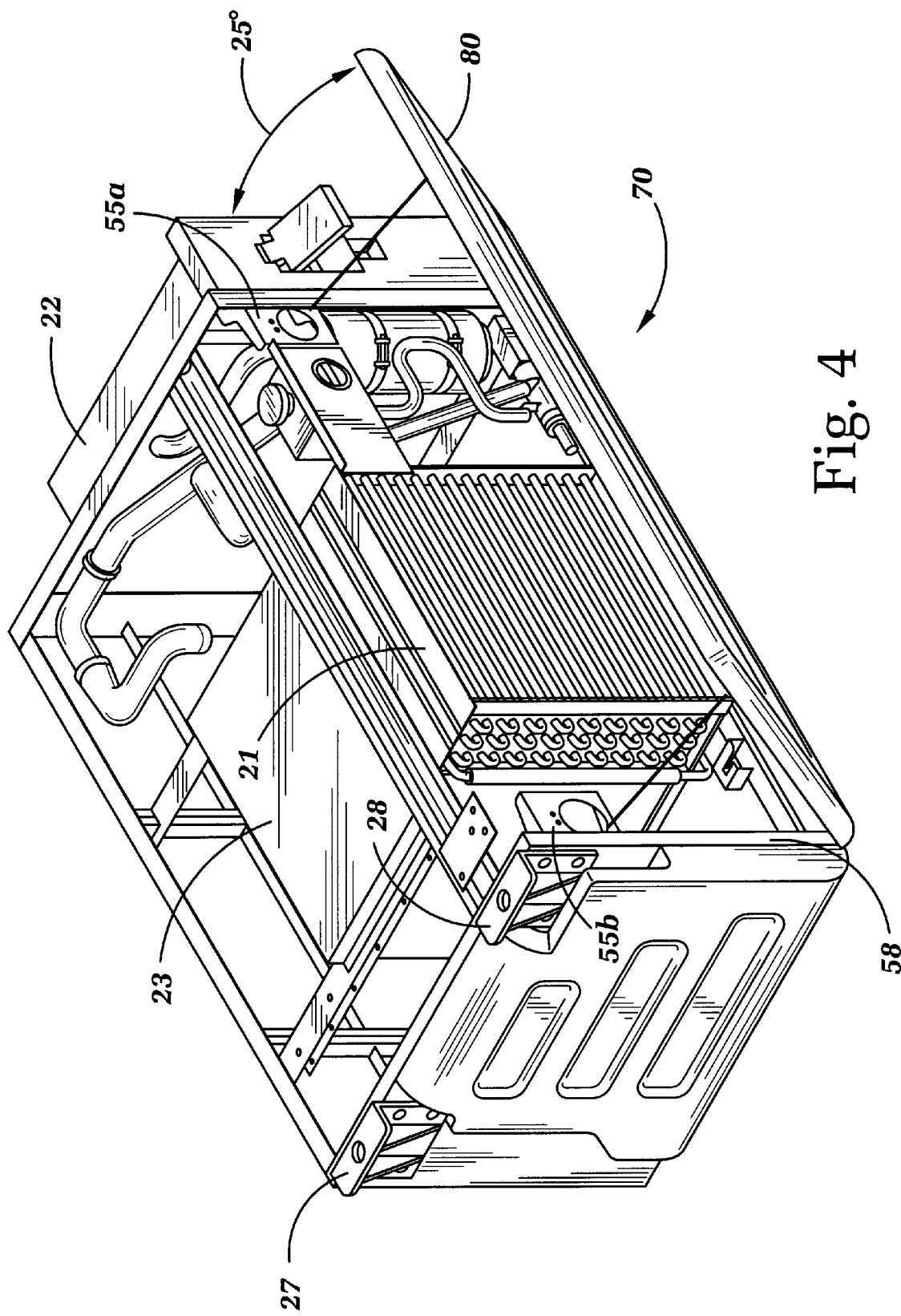
FIG. 4 is a perspective view of the temperature control unit of FIG. 3 showing an opposite end of the unit.

The access panel includes condenser inlet grille 71 that is made integral with the access panel in a conventional manner. The inlet grille has a plurality of perforations such as hexagonal openings that permit ambient air to be drawn through the grille and across the condenser coil 21 to remove heat from the refrigerant flowing through the condenser coil. The panel is movable toward and away from the frame as illustrated in FIGS. 2, 3, and 4.

The access panel is removably seated in guide channel 67 of rail 45 by at least one hinge member fixed to the back of access panel 70. As shown in FIG. 6, two hinge members 72a and 72b are fixed to panel 70. The hinges are the same so that as the description proceeds for simplicity, only hinge 72b will be described. Turning to FIGS. 7, 9a, 9b and 9c, each of the unitary hinges includes a substantially planar flange 73b that is fixed to panel 70 by a conventional connection means such as screws, bolts or the like. Guide portion 75b is joined to the flange by a hook portion 74b. Each guide portion has a stop 77b and a support portion 76b which fully supports the weight of the panel when the guide portion is closed and partially supports the panel weight when the panel is open. The guide portion is adapted to be removably seated in guide channel 67. The support portion has a center 79b and the support portion is rotatable about the center. As shown in the Figures, support portion 79b is substantially arcuate however the support portion may have any configuration necessary to achieve the desired movement of panel 70.

Cables 80a and 80b are fixed to locking plates 55a and 55b respectively and are removably connected to panel 70. The cables hold the panel open when it is rotated away from frame 40 to the intermediate and fully open positions shown in FIGS. 9b and 9c.

Description of the operation of panel 70 will now be described.

When it is necessary to provide maintenance to unit 20, the operator will press latches 57a and 57b to move detentes 58a and 58b out of engagement with the locking plates. The top edge 81 of panel 70 is then moved away from frame 40 in the direction of arrow 100 in FIG. 9b. Stop member 77b is moved out of engagement with rise portion 65 and the panel rotates about the center 79b of support portion 76b.

The panel continues outward until the hook portion is moved into engagement with track lip 62 as shown in FIG. 9b. The cables 80a and 80b are extended when the hooks 74a, 74b engage the lip 62. The panel rotates about twenty-five degrees relative to lip 62 when the panel is stopped by the engagement between hooks 74a and 74b lip 62. See FIGS. 4 and 9b. Movement to this intermediate position permits an operator to visually check system components and gain limited access to the interior of the unit in order to perform basic service such as cleaning condenser coil 21.

If it is necessary to gain full access to the interior of the unit 20, the access panel may be removed or moved to the fully open position shown in FIG. 9c. When the unit is moved to the fully open position the hinges are rotated about the support portion centers 79*a* and 79*b* located in guide channel 67; and then the guide portion is moved linearly toward rise 65 in the direction of arrow 101. The guide portion is moved linearly until stop 77*b* engages rise 65. When the access panel is fully open, hook 74*b* is located on lip 62. In the fully open position the panel makes an angle of approximately forty to forty-five degrees with the unit frame lip 62.

To remove the panel, the cables 80*a* and 80*b* are unhooked from the panel, and the guide portions are lifted out of the guide channel.

After servicing the unit 20, the panel may be reattached by relocating the hinge guide portions 75*a* and 75*b* in the guide channel 67 and moving the edge 81 toward frame 40 about support portions 76*a*, 76*b* until the stop members 77*a*, 77*b* engage the rail rise portion 65 at which time the latch detentes are in engagement with locking plate and the panel is locked in place.

By the present invention the time to service a temperature control unit is reduced because the access panel may be easily removed from the unit. The access panel of the present invention makes it much easier to gain access to regularly serviced components such as the air cleaner, belts such as the belt for the engine water pump, compressor service valves, and the coolant expansion tank, and also to check the oil level. Removal of the access door is accomplished quickly without the need to remove any fasteners before removing the panel.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A transport temperature control unit comprising:
   A) a frame having a first rail member which defines a guide channel;
   B) an access panel having a top access panel edge movable between a first position where the top edge is adjacent the frame and a second position where the top edge is located away from the frame, the access panel further including at least one hinge member with a flange fixed to the access panel and a guide portion located in the guide channel, the guide portion having a support portion with a center, the at least one hinge being rotatable about the support portion center within the guide channel to move the access panel between first and second positions.

2. The temperature control unit as claimed in claim 1 wherein the at least one hinge includes a hook portion joining the flange and guide portion.

3. The temperature control unit as claimed in claim 2 wherein the first rail member includes a lip, and wherein the hook is adapted to engage the lip when the access panel is moved to the second position.

4. The temperature control unit as claimed in claim 1 wherein each of the at least one hinges is unitary.

5. The temperature control unit as claimed in claim 1 wherein the access panel includes a grille that is made integral with the access panel.

6. The temperature control unit as claimed in claim 1 wherein the temperature control unit is for mounting under a vehicle frame.

7. The temperature control unit as claimed in claim 1 wherein the first rail member is comprised of an outer track and an inner track seated on the inner track.

8. The transport temperature control unit as claimed in claim 7 wherein the outer track is unitary and is comprised of an outer lip and a base.

9. The transport temperature control unit as claimed in claim 7 wherein the inner track is unitary and is comprised of a first land portion, a second land portion, and a rise portion joining the first and second land portions.

10. The transport temperature control unit as claimed in claim 7 wherein the outer track is unitary and is comprised of an outer lip and a base; the inner track is unitary and is comprised of a first land portion, a second land portion, and a rise portion joining the first and second land portions; and the guide channel is defined by the outer lip, the first land portion and the rise portion.

11. A combination comprising:
   A) a vehicle having a vehicle frame; and
   B) a transport temperature control unit attached to the vehicle frame, the unit comprising:
      i) a unit frame having a first rail member which defines a guide channel;
      ii) an access panel having a top access panel edge movable between a first position where the top edge is adjacent the unit frame and a second position where the top edge is located away from the unit frame, the access panel further including at least one hinge member with a flange fixed to the access panel and a guide portion located in the guide channel, the guide portion having a support portion with a center, the hinge being rotatable about the support portion center to move the access panel between first and second positions.

12. The combination as claimed in claim 11 wherein the at least one hinge includes a hook portion joining the flange and guide portion.

13. The combination as claimed in claim 12 wherein the first rail member includes a lip, and wherein the hook is adapted to engage the lip when the access panel is moved to the second position.

14. The combination as claimed in claim 11 wherein each of the at least one hinges is unitary.

15. The combination as claimed in claim 11 wherein the access panel includes a grille that is made integral with the access panel.

16. The combination as claimed in claim 11 wherein the temperature control unit is mounted under the vehicle frame.

17. The combination as claimed in claim 11 wherein the first rail member is comprised of an outer track and an inner track seated on the inner track.

18. The combination as claimed in claim 17 wherein the outer track is unitary and is comprised of an outer lip and a base.

19. The transport temperature control unit as claimed in claim 17 wherein the inner track is unitary and is comprised of a first land portion, a second land portion, and a rise portion joining the first and second land portions.

20. The transport temperature control unit as claimed in claim 17 wherein the outer track is unitary and is comprised of an outer lip and a base; the inner track is unitary and is comprised of a first land portion, a second land portion, and a rise portion joining the first and second land portions; and the guide channel is defined by the outer lip, the first land portion and the rise portion.

21. The combination as claimed in claim 11 wherein the vehicle is a truck.

22. A transport temperature control unit comprising:
   A) a frame having a first rail member which defines a guide channel;

B) an access panel having a top access panel edge movable between a first position where the top edge is adjacent the frame and a second position where the top edge is located away from the frame, the access panel further including at least one hinge member with a flange fixed to the access panel and a guide portion located in the guide channel, the guide portion having a support portion with a center, the hinge guide portion being movable within the guide channel to move the access panel between first and second positions.

23. The transport temperature control unit as claimed in claim 22 wherein the hinge guide portion is rotatable about the support portion center.

24. The transport temperature control unit as claimed in claim 22 wherein the support portions support the access panel when it is in the closed position.

25. The transport temperature control unit as claimed in claim 22 wherein the guide portion is rotatable about the support portion center and is movable linearly within guide channel to move the panel to the second position.

26. The transport temperature control unit as claimed in claim 22 wherein the guide portion includes a stop member that engages the guide channel when the access panel is in the closed position.

27. The transport temperature control unit as claimed in claim 22 wherein the hinge has a hook portion that engages the frame when the access panel is in the second position or the third position.

28. A transport temperature control unit comprising:

A) a frame having a first rail member which defines a guide channel;

B) an access panel having a top access panel edge movable between a first position where the top edge is adjacent the frame, a second position where the top edge is located a first distance from the frame, and a third position where the top edge is located a second distance from the frame, the access panel further including at least one hinge member with a flange fixed to the access panel and a guide portion located in the guide channel, the guide portion having a support portion with a center, the hinge guide portion being movable within the guide channel to move the access panel between first, second and third positions.

29. The temperature control unit as claimed in claim 22 wherein the second distance is greater than the first distance.

30. The transport temperature control unit as claimed in claim 28 wherein the hinge guide portion is rotatable about the support portion center when the panel is moved to the second position.

31. The transport temperature control unit as claimed in claim 28 wherein the guide portion is rotatable about the support portion center and is movable linearly within guide channel to move the panel to the third position.

\* \* \* \* \*